United States Patent [19]

Goldstein

[11] Patent Number: 4,767,480
[45] Date of Patent: Aug. 30, 1988

[54] COLD RECAPPING METHOD FOR TIRES UTILIZING UNCURED RUBBER AND SECTIONED MOLD

[75] Inventor: Leon C. Goldstein, Atlanta, Ga.

[73] Assignee: Long Mile Rubber Company, Dallas, Tex.

[21] Appl. No.: 655,940

[22] Filed: Sep. 28, 1984

Related U.S. Application Data

[63] Continuation-in-part of Ser. No. 411,883, Aug. 26, 1982, Pat. No. 4,571,277, which is a continuation-in-part of Ser. No. 361,403, Mar. 24, 1982, Pat. No. 4,500,375.

[51] Int. Cl.⁴ .......................................... B29D 30/58
[52] U.S. Cl. ...................................... 156/96; 156/909
[58] Field of Search ................ 156/96, 95, 97–98, 156/110.1, 125, 130.3, 130.5, 394.1, 909; 264/36, 501, 313–315, 325, 326; 425/17, 20, 25, 47

[56] References Cited

U.S. PATENT DOCUMENTS

| | | | |
|---|---|---|---|
| 1,653,835 | 12/1927 | Benaglia | 425/20 |
| 2,014,010 | 9/1935 | Wheatley . | |
| 2,094,511 | 9/1937 | Welch | 18/6 |
| 2,370,655 | 3/1943 | Glynn | 425/17 |
| 2,421,099 | 5/1947 | Vogt . | |
| 2,429,715 | 1/1944 | Glynn | 425/17 |
| 2,840,857 | 7/1958 | Lett | 425/20 |
| 2,966,936 | 1/1961 | Schelkmann . | |
| 3,207,647 | 9/1965 | Schelkmann . | |
| 3,236,709 | 2/1966 | Carver | 156/96 |
| 3,325,326 | 6/1967 | Schelkmann | 156/96 |
| 3,429,005 | 2/1969 | MacMillan | 425/47 |
| 3,752,726 | 8/1973 | Barefoot | 156/394 |
| 3,769,121 | 10/1973 | Martin | 156/96 |
| 3,779,830 | 12/1973 | Reppel . | |
| 3,779,831 | 12/1973 | Reppel . | |
| 3,779,832 | 12/1973 | Reppel . | |
| 3,779,833 | 12/1973 | Reppel . | |
| 3,884,739 | 5/1975 | Hindin et al. | 156/96 |
| 3,917,440 | 11/1975 | Huebert | 425/18 |
| 3,983,193 | 9/1976 | Wulker et al. | 264/36 |
| 3,989,428 | 11/1976 | Cox | 425/18 |
| 3,999,907 | 12/1976 | Pappas | 425/47 |
| 4,053,265 | 10/1977 | Wulker et al. | 425/20 |
| 4,090,901 | 5/1978 | Baatz | 156/96 |
| 4,115,171 | 9/1978 | Dundon | 156/96 |
| 4,185,056 | 1/1980 | Detwiler | 264/36 |
| 4,269,644 | 5/1981 | Goldstein | 156/96 |
| 4,588,460 | 5/1986 | Magee et al. | 156/96 |

FOREIGN PATENT DOCUMENTS

| | | |
|---|---|---|
| 1035891 | 8/1958 | Fed. Rep. of Germany . |
| 199580 | 11/1965 | Sweden . |
| 340524 | 10/1968 | Sweden . |
| 371136 | 11/1974 | Sweden . |
| 555680 | 9/1943 | United Kingdom . |
| 555689 | 9/1943 | United Kingdom . |
| 555690 | 9/1943 | United Kingdom . |

*Primary Examiner*—Michael Ball
*Attorney, Agent, or Firm*—Jerry W. Mills; Roger N. Chauza

[57] ABSTRACT

An apparatus and method for cold retreading or recapping of the running surface of a vehicle tire. A rubber, rope and cloth sectioned mold is produced utilizing a new tire male mold covered with perforated polypropylene film, uncured rubber with nylon rope at its edges and highly stretchable cloth enclosed in an envelope and cured by application of pressure and heat. A male mold is used to make the final female mold directly, or to make an intermediate mold which is used to produce a tread ring that is stretched to form a larger diameter male mold from which a final mold is prepared. The final mold is then sectioned to form one discontinuous section or two or more sections. Conveniently, one section from one size tire may be fitted with a section or sections from other size tires to form a mold to recap a third size tire. Additionally, radial inserts having the radial cross sections of the mold sections may be added to accommodate various tire sizes. The final mold thus produced is then utilized in recapping tires by fitting and fastening its sections and/or inserts around a prepared tire carcass coated with cement, a layer of uncured rubber, and a sheet of perforated polypropylene film. The mold and tire assembly is then enclosed in an envelope and placed in a chamber where curing of the rubber layer is accomplished by inflation of the tire carcass, evacuation of the envelope, pressurization of the chamber and application of heat.

11 Claims, 9 Drawing Sheets

COLD RECAPPING METHOD FOR TIRES UTILIZING UNCURED RUBBER AND SECTIONED MOLD

This application is a continuation-in-part of my co-pending application Ser. No. 411,883 filed Aug. 26, 1982, now U.S. Pat. No. 4,571,277, which is a continuation-in-part of my co-pending application Ser. No. 361,403, filed Mar. 24, 1982, now U.S. Pat. No. 4,500,375.

BACKGROUND OF THE INVENTION

This invention relates generally to an improved method for retreading the running surface of a vehicle tire, and more particularly to a novel method for producing a rubber and cloth sectioned tread mold and utilizing that tread mold around a buffed tire carcass covered with uncured rubber to accomplish retreading.

Heretofore, various methods have been employed for retreading vehicle tires. Commonly, worn tires are recapped by the warm vulcanization method, wherein an uncured tread cover or "camel-back" is applied to the buffed crown surface of the previously cured tire casing or carcass and the assembly is vulcanized at an elevated temperature in a suitable mold. A major disadvantage of this type of retread is that the fixed mold requires stretching and expansion of the tire during retreading because the tire must be smaller than the mold to insert it in the mold. Steel radial tires do not stretch; thus, mold size is critical, and numerous molds are necessary to accommodate the various steel radial tire dimensions which vary not only from one specified tire size to another but among tires of the same nominal size made by different manufacturers. Any deformation or distortion of the tire casing during the curing operation will tend subsequently to rupture or materially weaken the vulcanized bond between the cured "camel-back" and the crown surface of the tire after it is removed from the vulcanizing mold. In addition, the elevated vulcanizing temperature tends to weaken and deteriorate the previously cured tire casing.

The prior art has sought to overcome shortcomings in the warm vulcanization recapping method by various "cold" recapping methods utilizing both precured rubber treads and uncured rubber. One approach to cold recapping is disclosed in my U.S. Pat. No. 4,269,644, which involves a cold tire recapping method utilizing a precured tread strip and a rubber bonding composition between the strip and the prepared tire carcass and which is incorporated herein by this reference.

There are disadvantages associated with utilization of such previously manufactured precured rubber tread material, including the cost of that material as compared to the cost of uncured rubber, the need to maintain a large inventory of widths and tread designs, the difficulty of producing a tire having good physical appearance at the transition of tread and sidewall and the difficulty of retreading traction tires with deep sidewall voids.

A different recapping approach is disclosed in the U.S. Pat. No. 4,185,056 to Detwiler, which discloses the formation of a rubber mold and utilization of that mold together with uncured rubber to retread the prepared tire carcass. The patent to Detwiler discloses formation of the tread mold by utilizing a new mold tire which is coated with a mold release and then covered with a very loosely woven "fabric" network of strands, the transverse strands of which are intended to serve as air venting conduits during the curing operation. Such transverse strands become embedded in the cured female mold and thereafter serve little or no function during recapping utilizing the mold but weaken the tread-forming portion of the rubber mold.

Failure to provide a structure and/or method which effectively purges air and gases at the interface between the tread mold and the new tread during recapping causes excessive porosity within the new tread, which creates accelerated wear and tread to tire carcass bonding problems. Furthermore, utilization of transverse strands which become embedded in the mold results in limited mold life because the exposed rubber mold surface does not wear well, and tread groove-forming protrusions in the female retread mold tend to break off during use.

Another prior art approach similar to the Detwiler patent is disclosed in the U.S. Pat. Nos. 3,983,193 and 4,053,265 to Wulker. The Wulker patents disclose a resilient mold which has an unstretched inner diameter smaller than the outer diameter of the cured tread on the recapped tire. In use, the Wulker mold is stretched in order to place it around the tire carcass and uncured rubber assembly and the mold contracts to normal size to impress its pattern on the tread rubber. The Wulker patents disclose provision for purging air and other gases from the mold-tread interface comprising holes passing radially through the mold.

Additional limitations inherent in the prior art rubber molds and methods for recapping with uncured rubber typified by the U.S. Pat. Nos. 4,185,056 to Detwiler and 3,983,193 and 4,053,265 to Wulker include problems in fully seating the mold during recapping, difficulties in mounting the mold on a tire carcass and in removing the mold after curing of the recap tread is complete and the need for numerous molds having slightly different diameters in order to accommodate variations among tires being recapped.

Seating problems occur because of sealing contact between the carcass sidewalls and the sidewall-forming portion of the rubber mold which will not easily slide along the carcass sidewall and thereby permit the entire treadforming portion of the mold to seat in the uncured rubber as the recap tread is formed. A typical prior art approach to this problem involves repeated pressurization and evacuation of the envelope enclosing the carcass and mold during the curing cycle in an effort to "work" the mold into its fully seated position. This practice is inconsistent, however, with the need to maintain constant pressure during the early stage of recap curing in order to achieve optimum curing results.

Problems in mounting the tread mold on the uncured rubber and tire carcass and in removal of the tread mold from the cured recapped tire reduce production efficiency and such problems can frequently result in damage to the newly recapped tire and/or the mold.

SUMMARY OF THE INVENTION

The tire recapping method and apparatus of the present invention involve use of a sectioned compressible rubber and cloth tread mold to be placed about an uncured rubber layer on the tire carcass to be recapped. The tread mold is sectioned once, twice or more times radially to form a mold that may easily be placed about the tire body to be recapped, and it is then fitted and fastened together to form the mold. Radial inserts may be added to accommodate variations in tire size.

Where a new male mold tire is available having the desired tread pattern and transverse contour and which is one and one-half to two inches larger in diameter than the original diameter of tires to be recapped, that mold tire may be used to prepare a final female mold directly. If no such larger diameter male mold tire is available, a mold tire of the same diameter as the tires to be recapped may be used to produce a similar mold which will be used as an intermediate mold to prepare a tread ring from which the final mold is made.

In order to prepare the intermediate mold (or final mold if a larger diameter mold tire is available), a layer of uncured rubber is built up on the mold tire tread and then removed. The mold tire tread is then covered with thin perforated polypropylene film, a rectangle of highly stretchable synthetic cloth is positioned on top of the polyethylene film, and the uncured rubber is repositioned around the mold tire on top of the cloth. Two loops of nylon rope are positioned at the circular edges of the uncured rubber somewhat like the beads of a tire. The edges of the cloth are folded up over the ropes and uncured rubber and lapped over the top of the uncured rubber, thereby creating a "sock" entirely surrounding the uncured rubber and ropes and faced on the tread side with polyethylene film. The male mold tire, film, sock, ropes and rubber structure is then enclosed in a curing envelope like the one disclosed in my U.S. Pat. No. 4,269,644 and the uncured rubber is cured by application of heat and pressure in a chamber in accordance with the teaching of my U.S. Pat. No. 4,269,644 for curing the bond between the tire carcass and precured tread.

After removal from the male mold tire, the fabric and rubber female tread mold thus produced is sectioned and then used to recap tire carcasses as described below if it is a larger-diameter final mold. The final mold is sectioned to form one discontinuous tread mold, two tread mold halves, or three or more mold sections. Conveniently, one mold section from one size tire may be fitted with other mold sections from different size tires to form a tread mold for recapping a third size tire. Further, radial inserts may be added to accommodate varying tire sizes. The sectioning process may be accomplished to form straight, keyed, dovetailed or other section edges to allow the sections to meet each other securely when fitted together.

If the male mold is a like-diameter intermediate mold, it is utilized to produce a tread ring by first covering the buffed crown of a tire carcass of the diameter it is desired to recap with a sheet of thin, perforated polypropylene film and then a layer of uncured rubber slightly thicker than the mold tire tread depth. A sheet of thin, perforated polypropylene film is also placed between the uncured rubber and the intermediate mold, and the mold is placed around the tire on top of the uncured tread rubber previously applied. The assembly is then placed inside a curing envelope like the one disclosed in my U.S. Pat. No. 4,269,644, and cured by application of pressure and heat in a chamber. The pressure resulting when the envelope is evacuated to the atmosphere and the pressure within the curing chamber forces the envelope against the intermediate tread mold, which is in turn forced against and into the uncured rubber. The cloth face of the mold and film allow the sidewall-forming portions of the mold to slide against the corresponding areas of the tire carcass thereby permitting the mold to seat fully against the uncured rubber and tire carcass. The cloth which forms the surface of the tread mold also "wicks" or "bleeds" air and gases out of the tread pattern being formed, and the ropes likewise wick air and gases out of the tread pattern and significantly facilitate passage of such air and gases from the inside to the outside of the intermediate mold around the mold edges.

After curing is completed, the intermediate tread mold is removed from the tread ring and carcass assembly. The tread ring may be easily removed from the carcass assembly because of the polypropylene film between them.

A final tread mold is then prepared. First, a buffed tire carcass of the nominal diameter it is desired to recap is built up, to increase its diameter, with a layer of cured rubber on the order of twenty thirty-seconds of an inch thick (20/32"). The previously prepared tread ring is stretched and mounted on the built-up tire carcass and cured rubber assembly. The tread ring thus has a gross diameter greater than its original diameter by twice the thickness of the cured rubber layer. The tire carcass, cured rubber and tread ring assembly is then utilized to make a final mold in the same way the intermediate mold was produced. The final mold is then sectioned to form one discontinuous tread mold, two tread mold halves, or three or more mold sections as mentioned above.

The final mold may then be utilized to retread a previously prepared tire carcass by first coating the buffed crown of the carcass with cement and then applying a layer of uncured rubber. A sheet of thin, perforated polypropylene film is placed between the uncured rubber and the final mold, and the mold is easily placed around the tire by fitting and fastening the sections and/or inserts together around the tire. The assembly is cured inside a curing envelope, under pressure, in accordance with the teaching of my U.S. Pat. No. 4,269,644. Application of pressure causes the final mold to be compressed against the uncured rubber. Curing at relatively low temperatures (less than 212 F.) permits the recap tread rubber to conform to the final tread mold and fully form a tread design before it stops flowing as a result of curing, and such low temperatures do not damage the tire casing or carcass or turn moisture in the carcass to steam which would expand and damage the casing by causing separations within it. Curing in accordance with the present invention can, however, be accomplished at temperatures up to approximately 260 F. Curing of the recap tread at a relatively low temperature for a relatively long time under uniform pressure in accordance with the present invention also results, for a given type of rubber, in a higher Shore hardness in the recap rubber and, consequently, in a longer-wearing tread.

Utilization of the highly stretchable cloth as a mold surface, ropes at the mold edges, plastic film and preparation of a sectional final mold in accordance with the present invention thus achieves several advantages, particularly including the following:

1. The mold may be easily placed about a tire carcass to be recapped without the necessity for forcing or "walking" it about the tire by placing the sections around the carcass and then fitting and fastening the edges together.

2. Trapped air and all gases evolved during tread curing are vented from the mold, thereby avoiding problems which arise when such gases are not fully vented, including incomplete tread curing and excess tread porosity, which creates wear and bonding problems.

3. Treads formed utilizing the mold form properly and cure fully.

4. The cloth face of the mold substantially extends mold life because the cloth face wears better than a rubber surface.

5. It is substantially easier to release the finished recapped tire from the sectional mold than from continuous molds which must be worked off the tire.

6. Unlike loose strings or a loosely woven fabric network of strands utilized as a venting material, the cloth utilized in accordance with the mold does not fragment or fall out of the mold during use.

7. Extension of the cloth entirely around the mold eliminates the need for utilization of a canvas liner when producing the mold or utilizing it to recap tires because, like a liner, the cloth "bleeds"or "wicks" air and gases in the vicinity of the envelope valve. The cloth and mold edge ropes also wick out air and gases from the entire mold inside and outside surfaces during curing of the mold, and the cloth prevents clogging and imprinting of the envelope valve in the outside surface of the mold during both mold formation and recapping.

8. Side forming portions of the mold slide in contact with the tire carcass permitting the mold to seat fully on the carcass and uncured rubber during recapping.

9. Longer wearing recap treads are produced using a given type of rubber when curing is accomplished in accordance with the present invention.

Accordingly, an object of the present invention is to provide an improved flexible, sectioned mold which is easily placed about and later removed from the tire carcass being recapped, which produces superior recap treads, which can accommodate a relative wide range of tire sizes and which has a long service life.

A further object of the present invention is to provide an economical system for producing custom molds to allow the capability of recapping a broad range of sizes of tire carcasses with any desired tread design or configuration.

An additional object of the present invention is to provide a highly functional, inexpensive system for producing an improved sectioned flexible, compressible mold and utilizing it to retread tires in a "cold" recapping procedure which produces superior recapped tires.

Other object, features and advantages of the present invention will become apparent with reference to remainder of the specification, claims and drawings hereof.

DETAILED DESCRIPTION OF THE DRAWINGS

Figure 1:
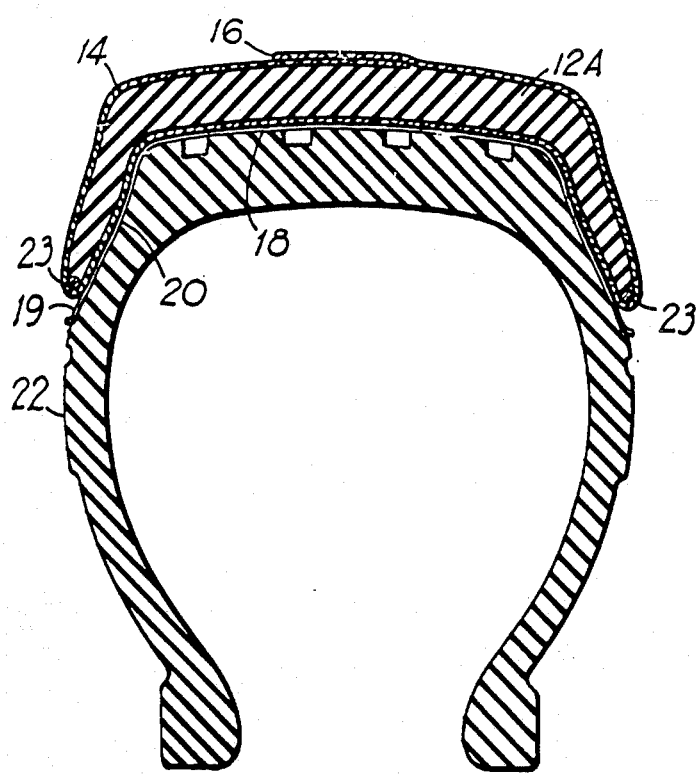
FIG. 1 is a cross-section of a male mold, shown as a tire of appropriate size and having a desired tread pattern covered with a sheet of plastic film, with the mold forming layer of uncured rubber shown surrounded by a layer of wicking cloth, the edges of which lap on the outside thereof.

FIG. 1 illustrates the relationship of elements required for production of the female intermediate mdld of the present invention, which may be utilized as a final mold if it is approximately one and one-half to two inches (3.25 to 5 cm.) larger in diameter than the original diameter of tires to be recapped. A layer of uncured rubber 12A enclosed in a sock 14 of highly stretchable synthetic cloth 16 is positioned on the tread 18 and selected sidewall portions 20 of male mold 22 and separated from male mold 22 by a suitable mold release 20 which may be a thin sheet of perforated plastic film 19, such as polypropylene film. Male mold 22 is typically a new tire having the desired tread 18 pattern and transverse contour desired for the recapped tread to be produced. Male mold 22 should be approximately one and one-half to two inches (3.25 to 5 cm.) larger in diameter than the original diameter of tires to be recapped if a final female mold is to be produced directly; if male mold 22 is the same diameter as such tires, an intermediate mold and tread ring must first be prepared as further described below. Male mold 22 is preferably a radial rather than bias-ply tire because radial tires are stiffer and thus better withstand molding pressure without deforming such that the tread pattern is distorted. A specific type of cloth 16 which has been shown to achieve the unexpected results of the present invention is a stretchable material known in the tire recapping industry as "wicking material," which is apparently produced by knitting polyester thread around parallel strands of elastic rubber.

The assembly shown in FIG. 1 is prepared by building up a layer of uncured rubber 12A on the tread area 18 of male mold 22. Layer 12A is then temporarily removed from male mold 22. A thin sheet of perforated polypropylene film or other appropriate mold release film 19 is positioned on male mold 22, and ropes 23, which may be three-eighths inch diameter braided nylon cord with ends butted to form a loop of the required diameter, are positioned at the edges of layer 12A. Then, the layer of uncured rubber 12A and ropes 23 are wrapped with a strip of cloth 16 at least twice as wide as layer 12A. Cloth 16 is positioned on the inside surface of layer 12A, or cloth 16 is positioned on the tread 18 of male mold 22 and layer 12A and ropes 23 are positioned on cloth 16, and the edges of cloth 16 are folded over the outer surface of layer 12A such that those edges overlap at any convenient location on the outside of layer 12A. When assembly is complete, the rubber 12A, ropes 23 and cloth 16 structure which will become the female mold are positioned around male mold 22 as shown in FIG. 1.

Figure 2:
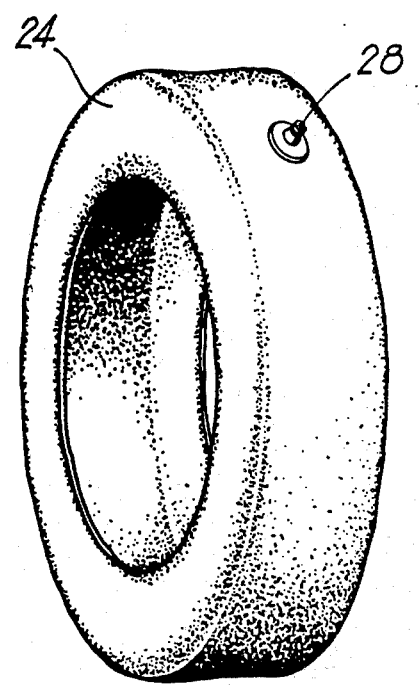
FIG. 2 is a perspective view of one of the envelopes utilized to enclose mold components and male mold tires during intermediate or final mold production, or final tread molds and tire carcasses during retreading, in accordance with the present invention.

Male mold 22, uncured rubber 12A, ropes 23, sock 14 and film 19 positioned as shown in FIG. 1 may then be enclosed in an envelope 24 as shown in FIG. 2. One or more such assemblies are then placed in a curing chamber as disclosed in my U.S. Pat. No. 4,269,644, which is incorporated in its entirety herein by reference, and curing of the uncured rubber layer 12A, and all other curing steps described herein, may be accomplished in accordance with the teaching of that patent for curing the rubber bonding composition between the precured tread strip and prepared tire carcass disclosed therein. Alternatively, each curing step described herein may be accomplished by other appropriate procedures which apply pressure and heat as required. The advantage of avoiding conversion of any moisture present into steam is achieved by curing at temperatures lower than 212 F., but curing of rubber layer 12A may be accomplished at temperatures up to approximately 260 F. with appropriate adjustment of the length of the curing time.

Figure 3:
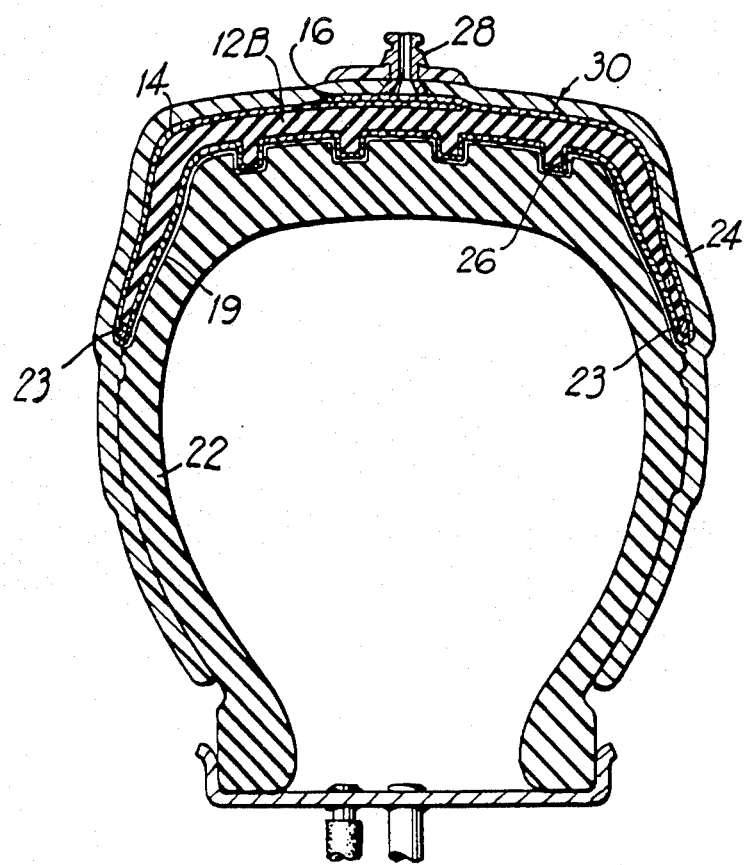
FIG. 3 is a cross-section of the assembly of FIG. 1 showing a tread mold mounted and being cured within the envelope shown in FIG. 2.

Referring now to FIG. 3, application of pressure during curing forces the cloth 16 and layer of uncured rubber 12A (shown in FIG.1) down into the grooves 26 of male mold 22, and a cured layer of rubber 12B forms which conforms to the shape of male mold 22 and has a surface formed by the sock 14 and film 19. The highly stretchable cloth 16 utilized for sock 14 is forced down into the grooves 26 by layer 12B and readily adapts to all contours of male mold 22. Because the cloth of sock 14 is a highly effective wicking material permitting passage of gases and air out of the area of interface between male mold 22 and sock 14, and because sock 14 conforms to the convolutions of male mold 22, sock 14 is highly effective in permitting venting of such gases and air. Additionally, the layer or layers of cloth 16 forming sock 14 on the outside of rubber layer 12B serve to facilitate passage of air and gases into a valve 28 in envelope 24 and to prevent imprinting and clogging of valve 28 in rubber layer 12B by pressure on the outside of envelope 24. Such imprinting and clogging would result in an undesirable depression in the female mold 30 being formed and would typically obstruct valve 28 thereby preventing passage of gases and air through it during mold 30 production and when mold 30 is utilized in recapping or in producing a tread ring as described below.

Figure 4:
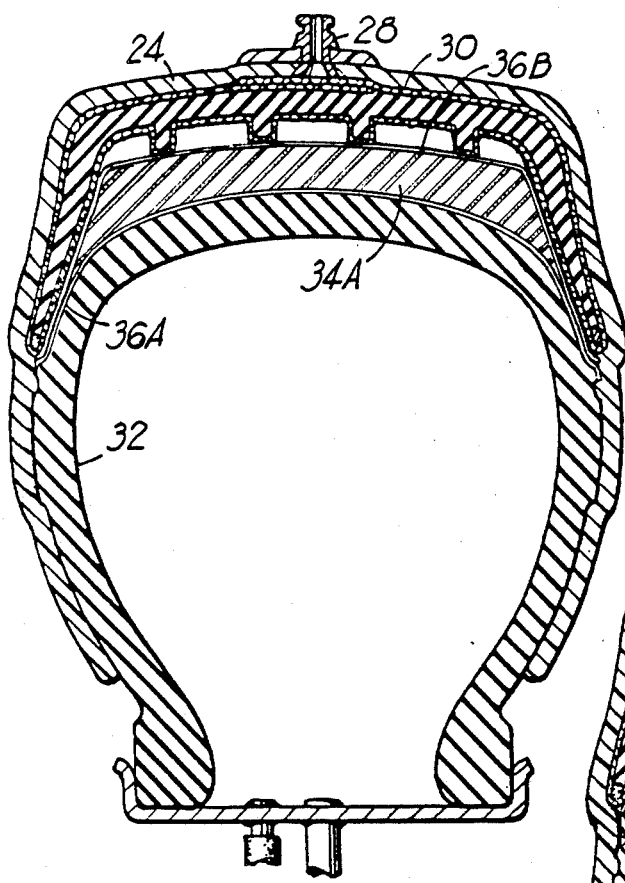
FIG. 4 is a cross-section of the intermediate tread mold of the present invention positioned on plastic film on a layer of uncured rubber in turn positioned on a second layer of plastic film on a tire carcass and enclosed in an envelope prior to evacuation of the envelope and application of pressure to form the tread ring of the present invention.

FIG. 4 illustrates the relationship of elements assembled for producing a tread ring. A layer of uncured rubber 34A which will become the tread ring is built up on a buffed tire carcass 32 of the same nominal diameter as tires it is desired to recap with a mold release such as sheet of thin, perforated plastic film 36A, such as polypropylene film, interposed between the uncured rubber layer 34A and the tire carcass 32. A second mold release sheet of thin, plastic film 36B is placed on top of layer 34A and mold 30 before positioning mold 30 around the tire carcass 32 on top of the film 36A and rubber layer 34A. The mold 30, carcass 32, rubber layer 34A and films 36A and 36B assembly is then placed inside a curing envelope 24. The assembly is placed in a chamber as disclosed in my U.S. Pat. No. 4,269,644, and rubber layer 34A is cured.

Figure 5:
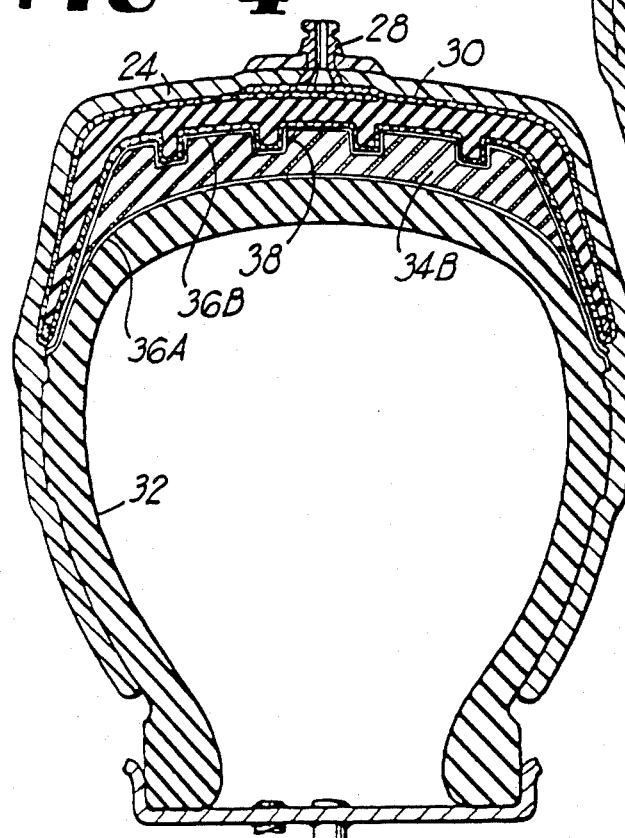
FIG. 5 is a cross-section of the components shown in FIG. 4 after evacuation and pressurization have occurred during curing of the tread ring.

Application of pressure during curing and evacuation of the envelope 24 forces mold 30 against layer 34A causing it to conform to pattern in the face of mold 30, as is illustrated in FIG. 5, thereby forming a cured rubber tread ring 34B having the desired tread pattern 38 therein. Tread ring 34B may be removed from tire carcass 32 after removal of mold 30.

Figure 6:
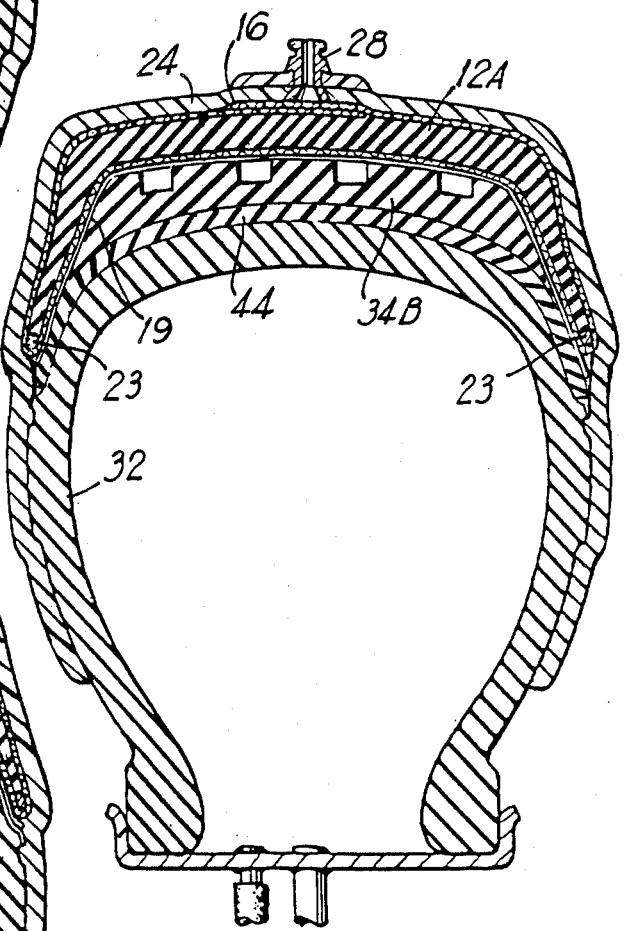
FIG. 6 is a cross-section of a final mold forming layer of uncured rubber shown surrounded by a layer of wicking cloth and positioned on a sheet of plastic film on the tread ring positioned in turn on a spacing layer on a tire carcass, with the assembly enclosed in the envelope shown in FIG. 2.

A final mold having a diameter larger than the tires to be recapped may then be prepared by first positioning elements as illustrated in FIG. 6. A spacing layer 44 of cured rubber or any other suitable material one-half as thick as the increase in diameter desired is positioned on the tread receiving area of tire carcass 32, and tread ring 34B is positioned on layer 44. Mold release such as a thin, perforated sheet of polypropylene or other appropriate film 19 is positioned on tread ring 34B. A layer of uncured rubber 12A, ropes 23, and wicking cloth 16 is then assembled around tread ring 34B, spacing layer 44 and carcass 32, and the assembly is enclosed in an envelope in accordance with the description of FIGS. 1 and 3 hereinabove. Curing is then accomplished by application of pressure and heat in accordance with my U.S. Pat. No. 4,269,644 or any other appropriate curing procedure.

Figure 7:
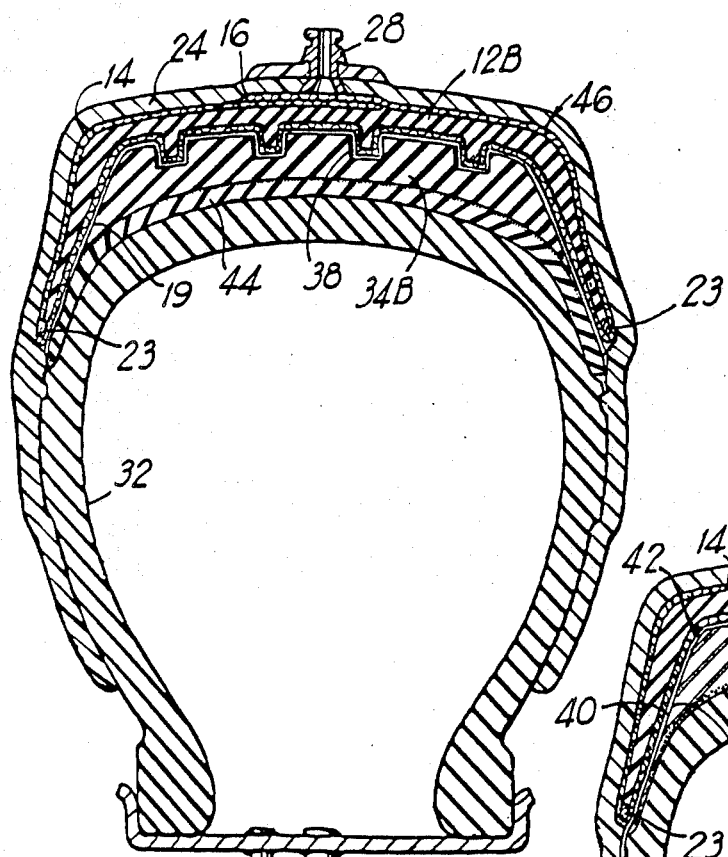
FIG. 7 is a cross-section of the components shown in FIG. 6 after evacuation and pressurization have occurred during curing of the final mold rubber.

Referring now to FIG. 7, application of pressure during curing forces the cloth 16 in uncured rubber layer 12A (shown in FIG. 6) down into the grooves of tread pattern 38 of tread ring 34B, and a cured layer of rubber 12B forms which conforms to the shape of tread ring 34B and has a surface formed by sock 14 and film 19, thereby forming a final tread mold 46.

The mold 30 or 46 after being formed is then sectioned to form one discontinuous or more sections 60 which may be fitted around a carcass 48 to be recapped. Sectioning may be accomplished simply by cutting mold 30 or 46 with a knife or blade or by stamping or otherwise bisecting portions of mold 30 or 46 to form straight edges 62 or edges 62 having corresponding projections 64 and recesses 68.

Projections 64 may take the form of pins 70 placed in an edge 62, corresponding with receptacles 72 placed in the corresponding edge 62 of an adjacent section 60. In a preferred embodiment, pins 70 are of 3/8 inch metal fitted into one-quarter inch holes drilled in edge 62 with the assistance of a conventional die for aligning and positioning the drill. Other methods may be used such as placing chalk marks on one edge 62, fitting the edges 62 together to form corresponding chalk marks on the corresponding edge 62 and drilling holes appropriately. Receptacles 72 are similarly drilled holes. Pins 70 and receptacles 72 markedly decrease the radial movement of one edge 62 with respect to an adjacent corresponding edge 62, and thus reduce undesirable markings on the recapped tread face.

Sections 60 may be fastened together by connectors 74 or by interlocking of projections 64 and recesses 68. Connectors 74 may take the form of pipe straps 76, rubber or other elastomeric straps 78 or straps having an overcenter locking device 80. Connectors 74 such as pipe straps 76 or straps with locking devices 80 are preferably mounted on mold 30 or 46 by use of fasteners 82 protruding from the exterior faces of mold 30 or 46. Fasteners 82 may be held in place by counter fittings 83 placed in the interior face of mold 30 or 46. Counter fittings 83 may have threaded bores so that fasteners may be screwed in or out of them easily. Fasteners 82 may also take the form of threaded studs 84 protruding from mold 30 or 46 with corresponding nuts 86, rivets or other appropriate fasteners. The use of rivets 88 may obviate the need for counter fittings 83. Where connectors 74 are straps with locking devices 80, such fasteners may mount straps 80 to one edge 62 and the locking devices to a corresponding edge 62. Where connectors 74 are rubber straps 78, fasteners 82 may simply be studs with threads, grooves or unthreaded portions to capture corresponding holes in straps 78.

In a preferred embodiment, connectors 74 are utilized on the exterior face and sidewalls of mold 30 and 46, although varying configurations may be used.

Figure 11:
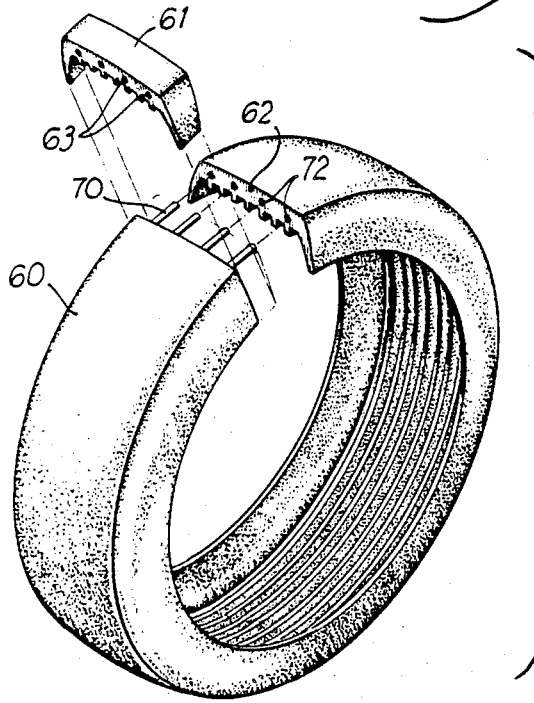
FIG. 11 is a perspective view of a final female mold according to the present invention after it has been sectioned into one discontinuous section, together with a mold insert.

The mold of the present invention may easily be configured to accommodate varying sizes of tires by the use of one or more discontinuous sections 60 and one or more radial inserts 61 corresponding in radial cross-section to sections 60. Such inserts 61, as shown in FIG. 11, having small arc length, may be drilled edge to edge with holes corresponding to extended pins 30 protruding from a section edge 62. Where inserts 61 are longer, as in FIG. 12, they may be fitted with pins 70 and receptacles 72. Conveniently, a set of various sizes of inserts 61 may be fabricated by sectioning a sister mold at the time mold 30 or 46 is formed to accommodate various ranges of tire sites. In the event an insert 61 is of appropriate length, it may be fitted with connectors 74 and corresponding fasteners 82, in addition to pins 70 and receptacles 72.

Figure 8:
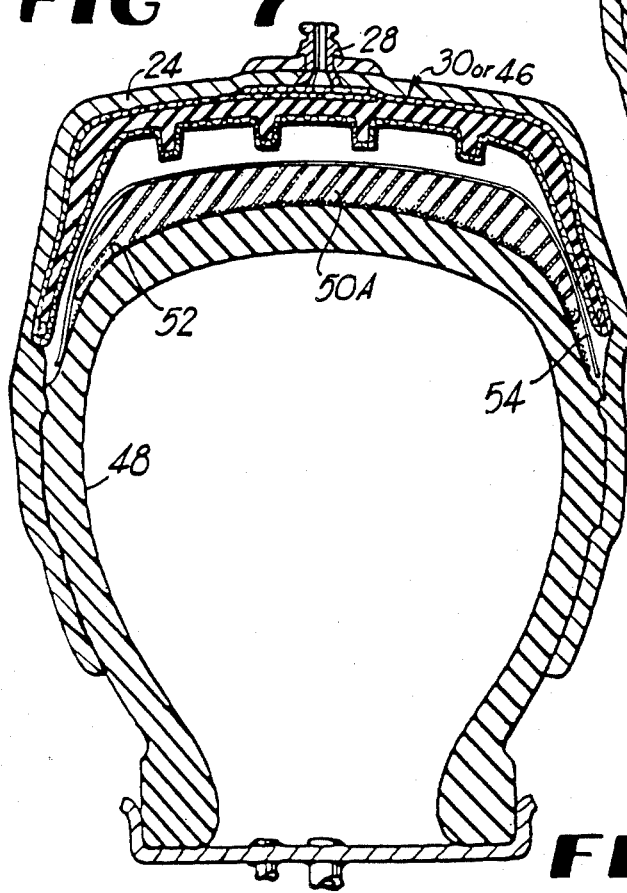
FIG. 8 is a cross-section of a final tread mold of the present invention positioned on plastic film on a layer of uncured rubber on a tire carcass and enclosed in an envelope prior to evacuation of the envelope and application of pressure during curing to recap the carcass.

FIG. 8 illustrates the relationship of elements assembled for recapping a prepared tire carcass 48 in accordance with the present invention. A layer of uncured rubber 50A which will become the recapped tire 48 tread surface is built up on the prepared tire carcass 48 after coating the buffed crown of carcass 48 with cement 52. Mold release such as a sheet of thin, perforated plastic film 54, which may be polypropylene film, is placed between a layer 50A and mold 30 before positioning mold 30 or 46 around the tire carcass 48 on top of rubber layer 50A. Mold 30 or 46 is positioned around layer 50A by placing sections 60 and/or inserts 61 around carcass 48 and layer 50A and fitting and fastening edges 62 together. Where pins 70 and receptacles 72 are utilized, such fitting and fastening is accomplished by mating pins 70 and receptacles 72 and then fastening connectors 74 to fasteners 82 as appropriate. Where projections 64 and recesses 68 are utilized, a layer of substantially flexible material 70 such as plexiglass may be backed, adhered or placed on the outer surface of mold 30 or 46 corresponding to edges 62 to prevent edges 62 from sliding diametrically with respect to one another during curing or otherwise forming irregularities in rubber layer 50A, when pins 70, receptacles 72 and connectors 74 are not used. The mold 30 or 46, carcass 48, rubber layer 50A and film 54 assembly is then placed inside a curing envelope 24. Two or more such assemblies are then placed in side by side relationship as disclosed in my U.S. Pat. No. 4,269,644, and rubber layer 50A is cured by application of heat and pressure in accordance with the teaching of that patent or any other appropriate curing procedure. As noted above, the advantage of avoiding conversion of moisture to steam is achieved by curing at temperatures lower than 212 F., but curing of rubber layer 34A may be accomplished at temperatures up to approximately 260 F. with appropriate adjustment of the length of the curing time.

Figure 9:
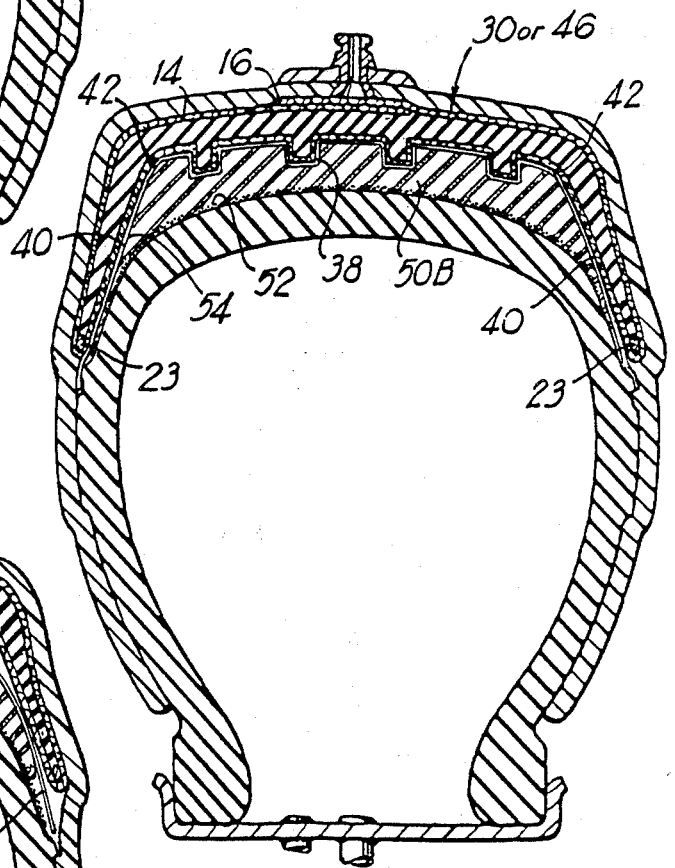
FIG. 9 is a cross-section of the components shown in FIG. 8 after evacuation and pressurization have occurred during curing of the recap tread.

Application of pressure during curing and evacuation of envelope 24 compresses and forces mold 30 or 46 against layer 50A causing it to conform to the pattern in the face of mold 30 or 46, as is illustrated in FIG. 9, thereby forming a cured rubber layer 50B having the desired tread pattern 38 therein. The relatively low friction surfaces presented by cloth 16 face of female mold 30 or 46 and plastic film 54 permit relatively free sliding contact between mold 30 or 46 and rubber layer 50B in sidewall areas 40, thereby permitting mold 30 or 46 to seat fully on layer 50B, including the "corners" 42 of mold 30 or 46 which frequently do not seat fully in prior art molds.

The cloth 16 face of mold 30 or 46 and film 54 and sectioning of the mold 30 or 46 also permit easy removal of mold 30 or 46 from tire 48 after completion of the curing cycle. Film 54 typically molds into and adheres to the finished surface of tread 38, imparting a shiny appearance thereto; accordingly, no film 54 removal step is required after completion of the curing cycle.

Figure 10:
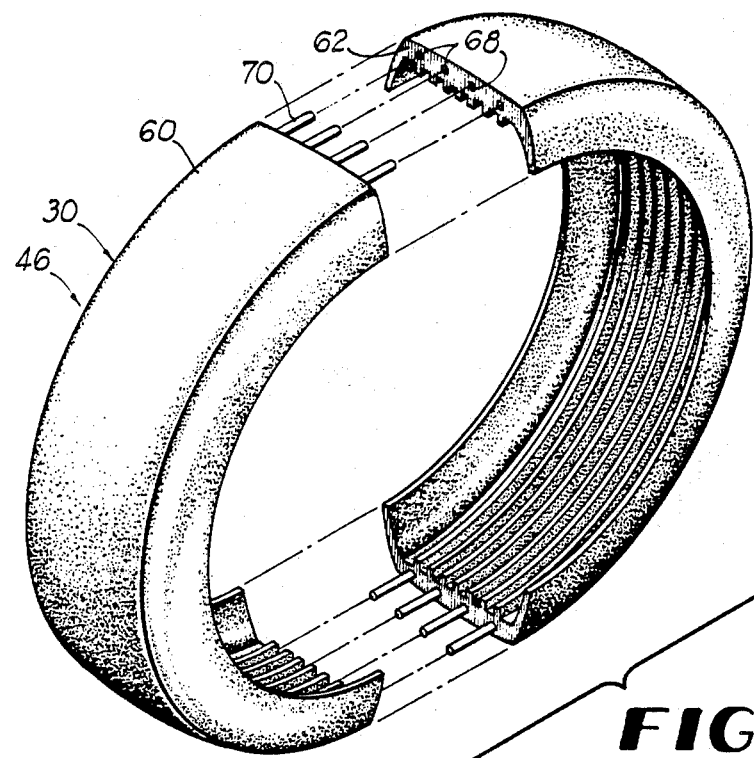
FIG. 10 is a perspective view of a final female mold according to the present invention after it has been sectioned into two sections of equal arc length, each section having pins and receptacles.

FIGS. 10-18 show sections 60 having corresponding pins 70 and receptacles 72 disposed in edges 62. As shown in FIG. 10, two sections of equivalent arc length may have pins 70 disposed in one edge corresponding to receptacles 72 in a corresponding edge of an adjacent section 60. Although four pins 70 are shown disposed in such edges 62 in FIG. 10, more or fewer pins 70 may be used.

Figure 12:
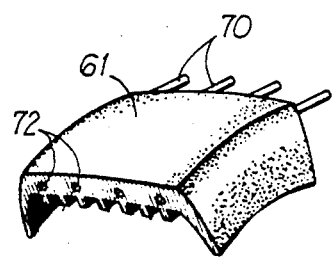
FIG. 12 is a perspective view of a mold insert according to the present invention having pins and receptacles.

FIGS. 11 and 12 show the use of inserts 61 to allow mold 30 or 46 to accommodate tires of varying size. As shown in FIG. 11, insert 61 may simply be drilled with holes 63 from one edge 62 to the other edge 62, corresponding to pins 70 in an adjacent section 60 or insert 61. FIG. 12 shows an insert 61 of somewhat longer arc length having pins 70 and receptacles 72 rather than holes 63. Connectors 74 and fasteners 82 may be mounted on mold sections 60 and extend across inserts 61 to connect sections 60 together, or inserts 61 may also be fitted with connectors 74 and fasteners 82.

Figure 13:
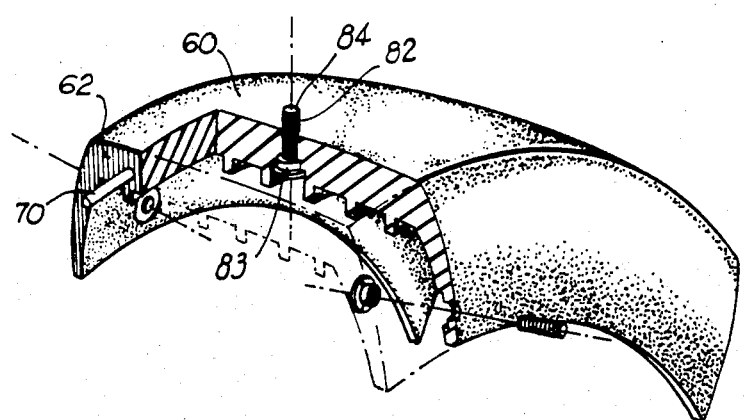
FIG. 13 is a partial cross-sectional view of a section of a final female mold according to the present invention showing disposition of fasteners in the section.
Figure 14:
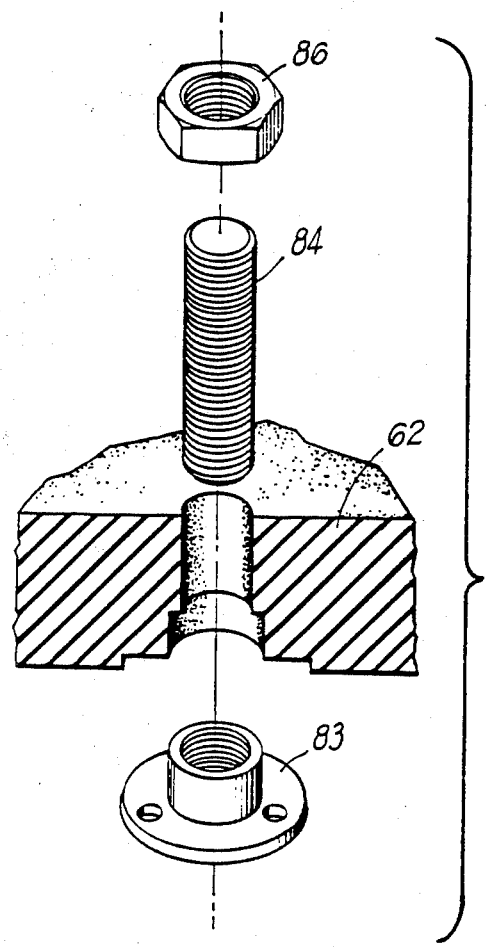
FIG. 14 is a schematic view of a portion of a section of a final female mold according to the present invention showing in further detail disposition of a fastener in the section.
Figure 15:
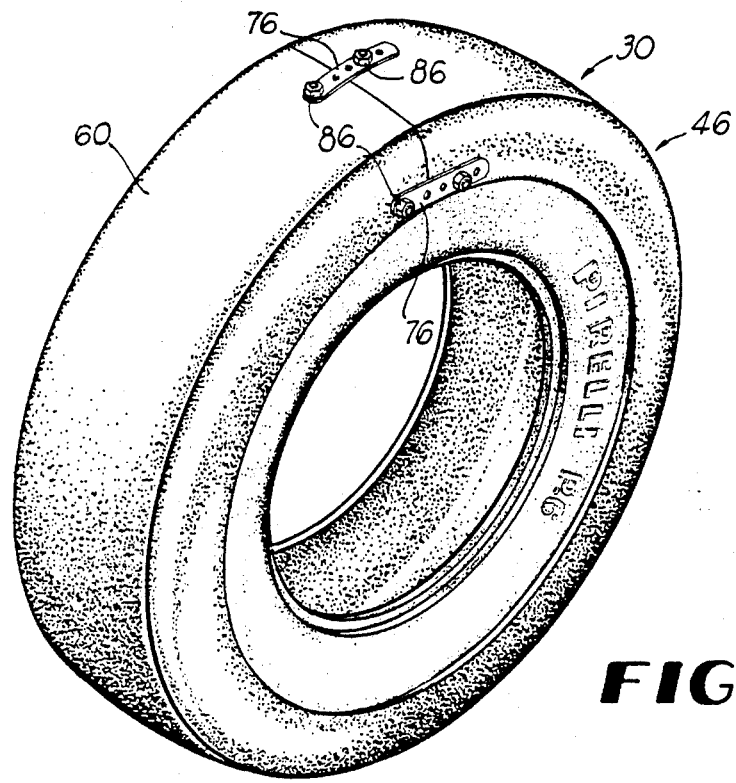
FIG. 15 is a perspective view of a final female mold according to the present invention disposed around a tire to be recapped and fitted and fastened with connectors and fasteners.

FIGS. 13 and 14 show one version of a fastener 82 according to the present invention comprising a counterfitting 83 with threaded shaft 84 and corresponding nut 86. Any number of such fasteners may be mounted in each section 60, each to receive a connector 74. FIG. 15 shows the fasteners of FIGS. 13 and 14 utilized in connection with pipe straps 76.

Figure 16:
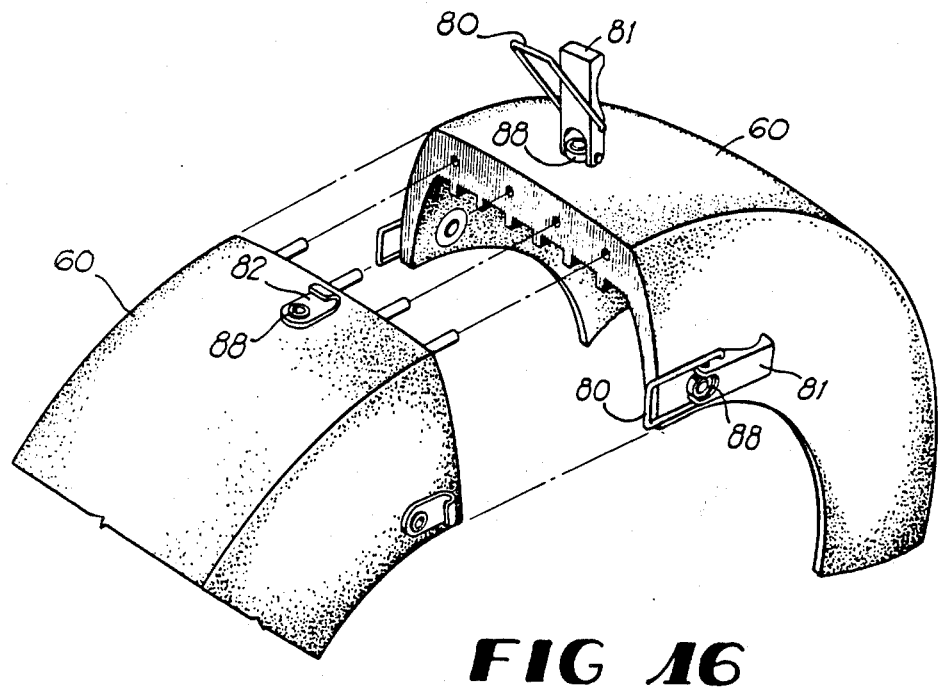
FIG. 16 is a perspective view of portions of sections of a final female mold according to the present invention showing a second, over-center type connector.
Figure 17:
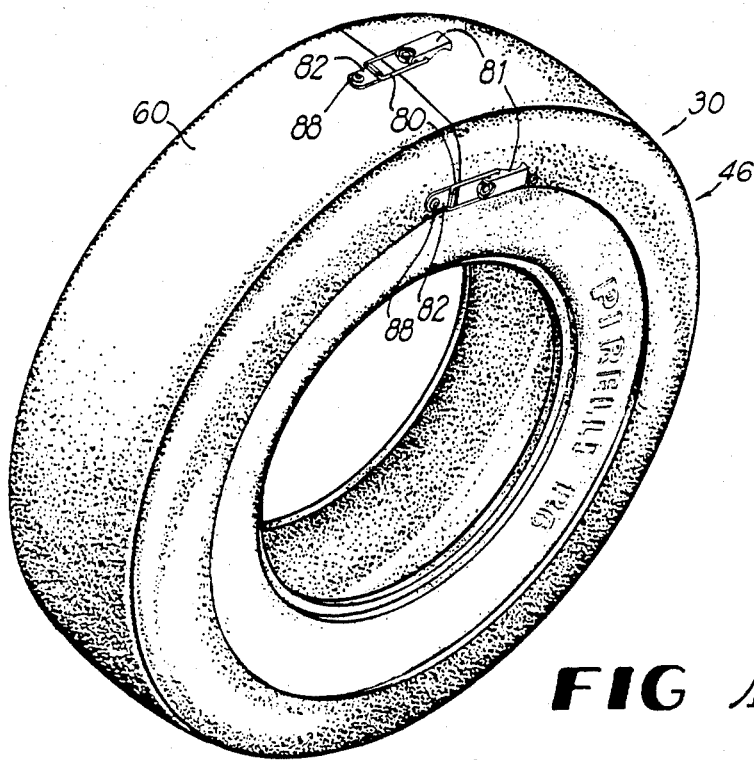
FIG. 17 is a perspective view of a final female mold according to the present invention disposed about a tire to be recapped showing use of the connector of FIG. 16.

FIGS. 16 and 17 show fasteners such as those shown in FIGS. 13 and 14 utilized in connection with overcenter locking devices 80. Thumb type over-center locking device 80 or other locking devices can save time in fastening mold sections 60 around the tire to be recapped.

Figure 18:
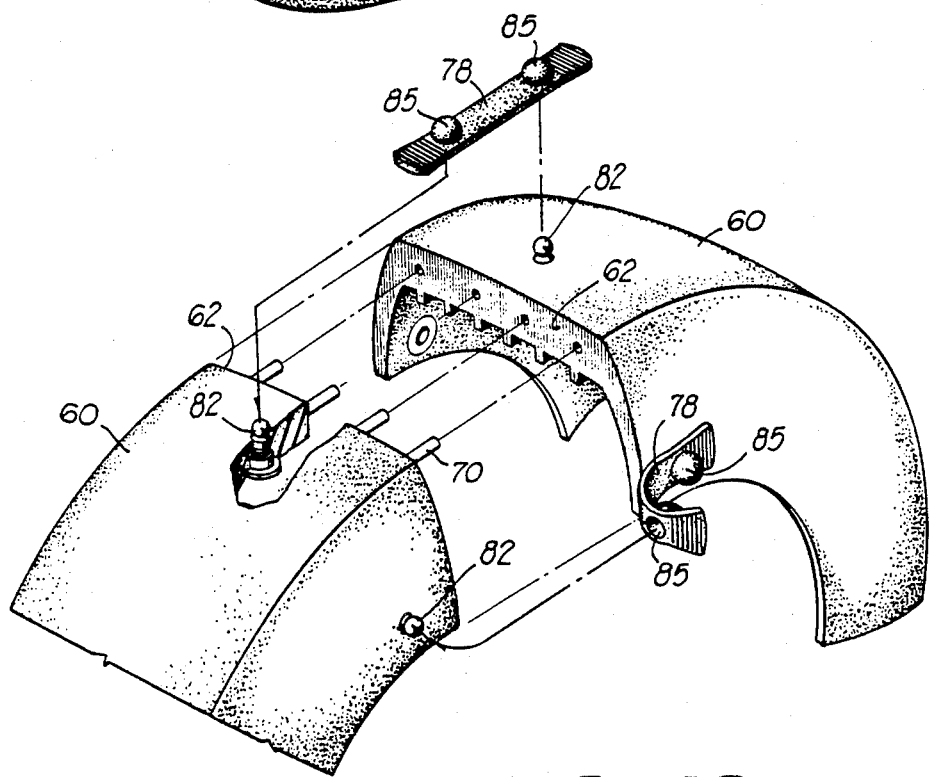
FIG. 18 is a perspective view of portions of sections of a final female mold according to the present invention showing use of a third, elastic strap type connector.

FIG. 18 shows a third type of connector 74 comprising a rubber strap 78 which is stretched and whose knobs 85 receive fasteners 82 to hold sections 60 together.

Figure 19:
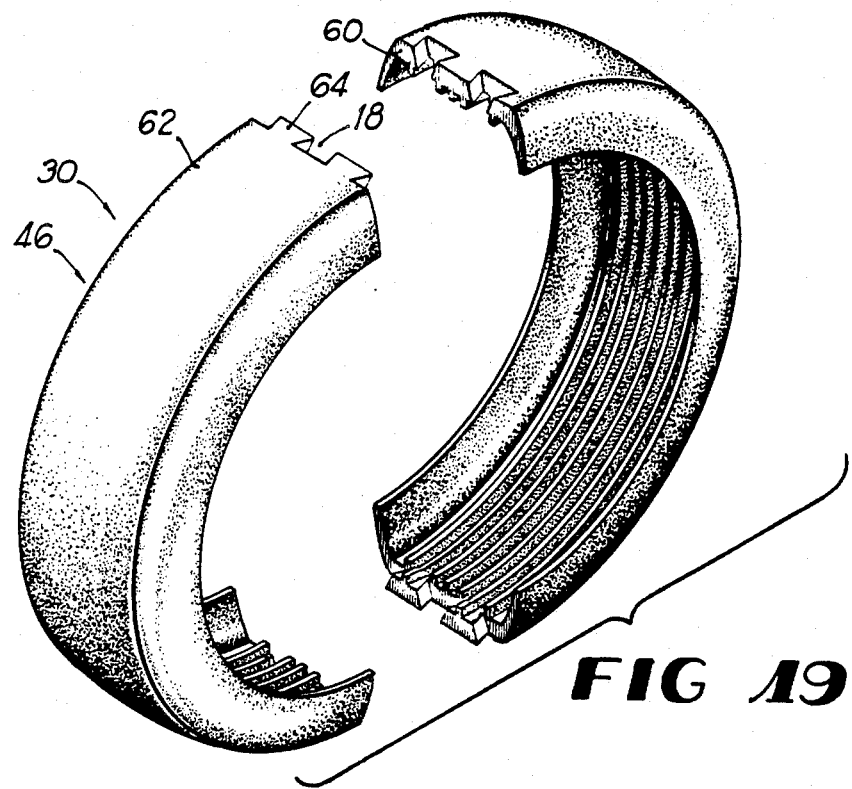
FIG. 19 is a perspective view of a final female mold according to the present invention having dovetail type protrusions and recesses for fitting and fastening together the mold sections.

FIG. 19 shows mold sections 60 of the present invention having dovetailed corresponding projections 64 and recesses 68 to fit and fasten sections 60 together. Such projections 64 and recesses 68 may be bevelled to reduce leakage of uncured rubber during the molding process.

Figure 20:
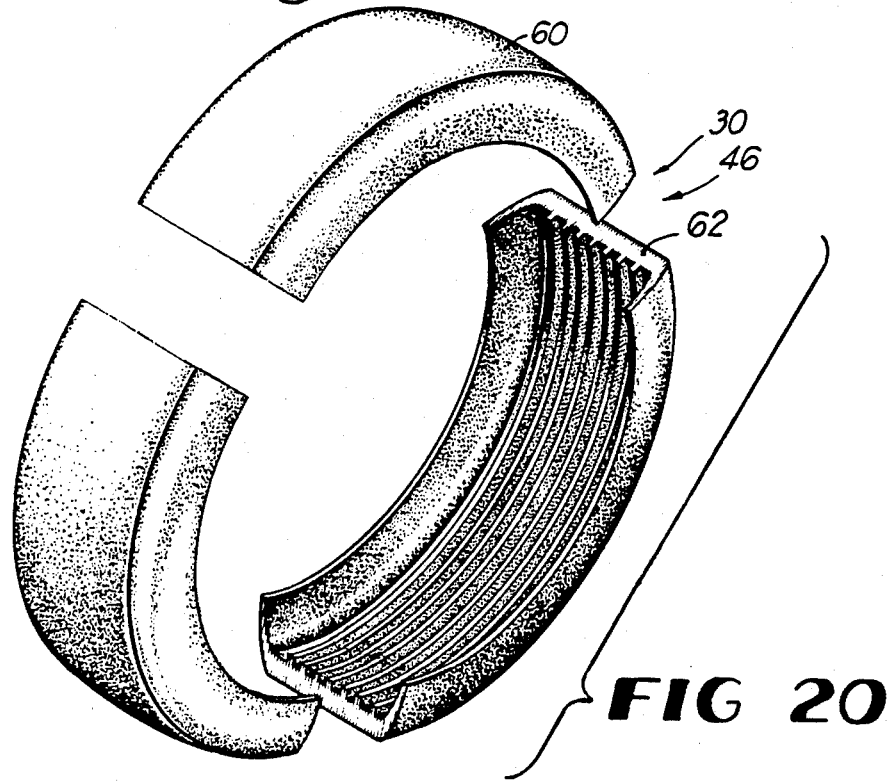
FIG. 20 is a perspective view of a final female mold according to the present invention sectioned into three sections.

FIG. 20 shows a mold 30 or 46 according to the present invention sectioned into three sections of equivalent arc length and having straight edges 62. More sections 60 may be utilized, and, similarly, mold 30 or 46 may be sectioned into inserts for use with mold section 60 having the same radial cross-section.

Figure 21:
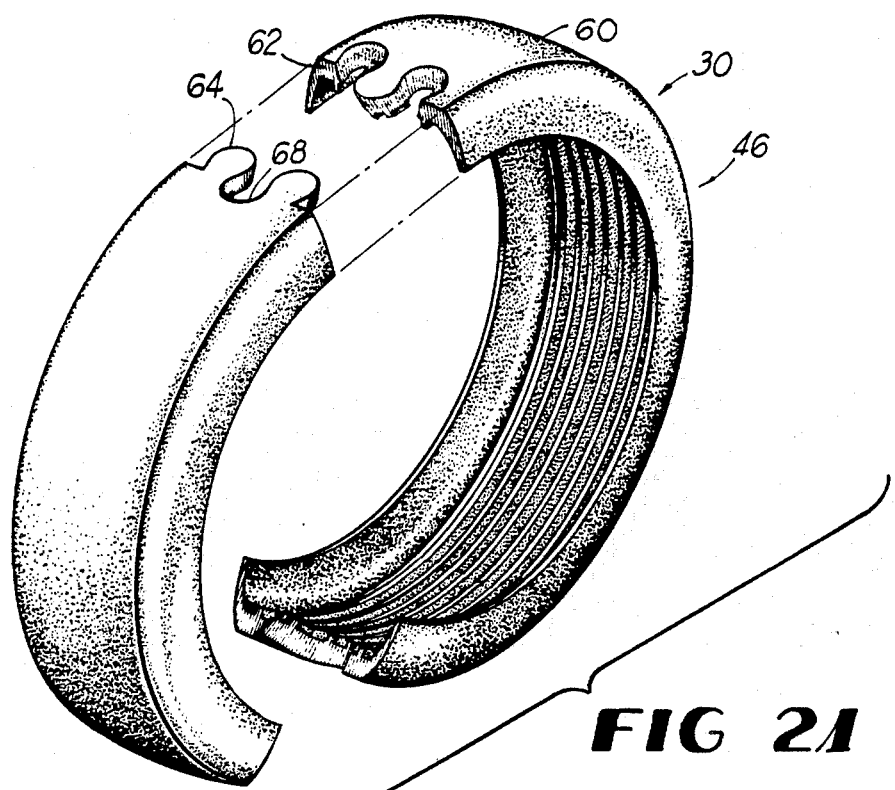
FIG. 21 is a perspective view of a final female mold according to the present invention having two sections of dissimilar arc lengths, each section having bevelled protrusions and recesses.

FIG. 21 shows mold sections 60 of the present invention having dissimilar arc lengths and rounded, bevelled projections 64 and recesses 68. A first section 60 may be formed from one size tire, and a second section 60 may be formed from a second size tire and fitted and fastened together to retread a third size tire as shown with reference to FIG. 21.

Figure 22:
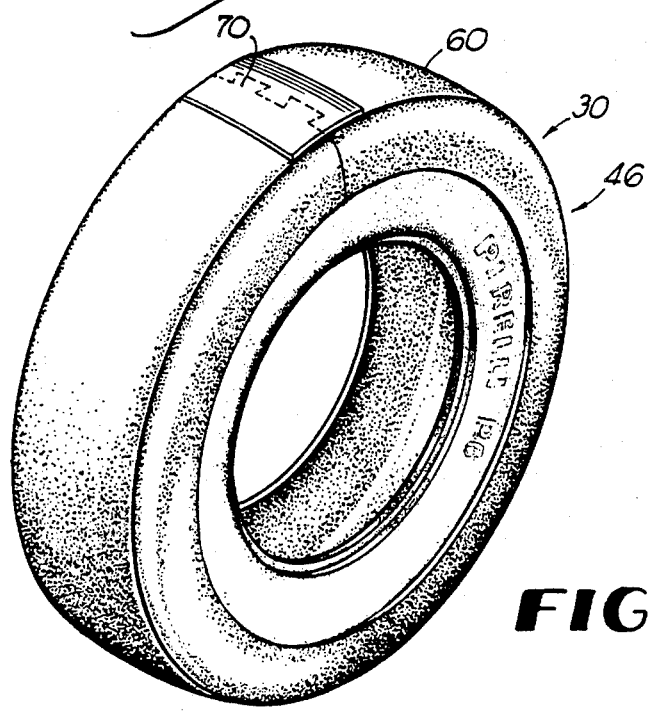
FIG. 22 is a perspective view of a final female mold according to the present invention disposed about a tire to be recapped showing backing of the discontinuity between edges using a piece of substantially flexible material.

FIG. 22 shows use of a substantially flexible backing material 70 placed on the outer surface of the discontinuity between edges 62 of mold section 60 to reduce any imprint on the retread surface caused by misalignment of edges 62.

Although the present invention is described and illustrated with detailed reference to the disclosed embodiments, the invention is not intended to be limited to the details of such embodiments, but includes numerous modifications and changes thereto while still falling within the intent and spirit hereof.

I claim:

1. A cold tire recapping method utilizing uncured rubber and a prepared tire carcass, comprising the steps of:
   (a) preparing a flexible final female rubber mold having a negative tread pattern and having a diameter greater than the diameter of the tire carcass;
   (b) sectioning the final female mold into at least one section;
   (c) placing a plurality of registration pins in at least one edge of at least one section of said final female mold;
   (d) forming a plurality of registration receptacles in at least one edge of at least one section of said final female mold, each receptacle for receiving one of the pins;
   (e) mounting at least one connector to at least one of the sections, each connector for fastening the edges together;
   (f) mounting at least one fastener to at least one of the sections, each fastener for receiving one of the connectors;
   (g) applying a layer of uncured rubber to the running surface of the prepared tire carcass, fitting the final female mold sections about the layer of uncured rubber;
   (h) joining the ends of the final female mold together in an edge abutting relationship interengaging the respective registration pins and receptacles;
   (i) connecting together the fastener and the connector to maintain the section edges joined in said abutting relationship throughout the recapping process;
   (j) applying a radial compressive force to the flexible female mold so that the mold is pressed against the layer of rubber to thereby impress the mold tread pattern into the layer of rubber; and
   (k) molding, curing and bonding the layer to the carcass in the final female mold.

2. A cold tire recapping method according to claim 1 wherein said connectors comprise metal straps.

3. A cold tire recapping method according to claim 1 wherein said connectors comprise elastic straps.

4. A cold tire recapping method according to claim 1 wherein each of said connectors further comprises at least one locking device.

5. A cold tire recapping method according to claim 1 further comprising the step of placing at least one mold insert on said pins of at least one mold section.

6. A cold tire recapping method according to claim 5 further comprising the steps of:
   (a) forming at least one mold insert having the same radial cross-section as said final female mold;
   (b) placing a plurality of pins in at least one edge of the mold insert, each pin corresponding to one of said receptacles; and
   (c) forming a plurality of receptacles in the other edge of the mold insert, each receptacle corresponding to one of said pins.

7. A cold tire recapping method according to claim 6 further comprising the steps of:
   (a) mounting at least one connector on the mold insert; and
   (b) mounting at least one fastener on the mold insert for receiving a connector.

8. A cold tire recapping method according to either of claims 5 or 6 further comprising the steps of:

(a) fitting said pins, receptacles and edges together; and
(b) fastening said connectors to said fasteners.

9. A cold tire recapping method according to claim 7 further comprising the steps of:
(a) fitting said pins, receptacles and edges together; and
(b) fastening said connectors to said fasteners.

10. The cold tire recapping method according to claim 1 further comprising preparing the final female mold by utilizing an intemediate male mold which is larger in diameter than that of the tire carcass.

11. The cold tire recapping method according to claim 1 further comprising sealing an envelope to said tire carcass to enclose therein the flexible female mold and the layer of uncured rubber.

* * * * *